United States Patent
Morselli et al.

(10) Patent No.: US 9,052,011 B2
(45) Date of Patent: Jun. 9, 2015

(54) TORQUE SENSOR SYSTEM

(71) Applicant: CNH America LLC, New Holland, PA (US)

(72) Inventors: Riccardo Morselli, San Vito di Spilamberto (IT); Stefano Fiorati, Occhiobello (IT)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/901,931

(22) Filed: May 24, 2013

(65) Prior Publication Data

US 2014/0345374 A1 Nov. 27, 2014

(51) Int. Cl.
*G01L 3/04* (2006.01)
*F16H 59/16* (2006.01)
*G01M 13/02* (2006.01)

(52) U.S. Cl.
CPC *F16H 59/16* (2013.01); *G01L 3/04* (2013.01); *G01M 13/022* (2013.01); *G01M 13/02* (2013.01)

(58) Field of Classification Search
CPC ....... F16H 59/16; F16H 61/12; F16H 61/472; G01M 13/022; G01M 13/025; G01M 13/02
USPC ...................................... 73/115.02
See application file for complete search history.

(56) References Cited

U.S. PATENT DOCUMENTS

| | | | | |
|---|---|---|---|---|
| 5,992,243 A * | 11/1999 | Leeper | | 73/862.31 |
| 6,687,623 B2 | 2/2004 | Bailey | | |
| 7,677,339 B2 * | 3/2010 | Oscarsson | | 180/24.02 |
| 7,813,857 B2 * | 10/2010 | Mizon et al. | | 701/68 |
| 7,886,863 B2 * | 2/2011 | Marsh et al. | | 180/383 |
| 8,165,750 B2 * | 4/2012 | Tsukasaki et al. | | 701/37 |
| 8,321,115 B2 * | 11/2012 | Oral | | 701/85 |
| 8,527,175 B2 * | 9/2013 | Takeda et al. | | 701/70 |
| 8,626,417 B2 * | 1/2014 | Oral | | 701/85 |
| 2005/0273218 A1 * | 12/2005 | Breed et al. | | 701/2 |
| 2007/0290461 A1 * | 12/2007 | Oscarsson | | 280/6.15 |
| 2009/0048790 A1 * | 2/2009 | Geraghty et al. | | 702/42 |
| 2012/0330572 A1 | 12/2012 | Longman | | |

FOREIGN PATENT DOCUMENTS

WO WO 2007105186 3/2007

* cited by examiner

*Primary Examiner* — Freddie Kirkland, III
(74) *Attorney, Agent, or Firm* — Sue C. Watson

(57) ABSTRACT

A torque sensor system is provided, which comprises a frame supporting a first shaft and a second shaft. The first shaft comprises a first connector that is connected to second connector comprised by the second shaft so that a torque is transmittable via the first and second connectors from the first shaft to the second shaft. The first connector and second connector are formed such that transmitting a torque induces a reaction force to the frame. The frame is provided with at least one load sensor that is adapted to measure the reaction force, such that an output of the load sensor represents the transmitted torque.

15 Claims, 2 Drawing Sheets

TORQUE SENSOR SYSTEM

TECHNICAL FIELD

The present invention relates to a torque sensor system that is adapted for measuring a torque transmitted to a shaft. Preferably, the invention relates to a torque sensor system that is usably in vehicles such as all-wheel drive (AWD) agricultural vehicles.

BACKGROUND

Automatic transmissions of recent all-wheel drive (AWD) vehicles have become increasingly common as microcomputer technology has continued to advance and has made it possible, with a control computer and a number of control elements, e.g. servo motors, to precision control this engine speed, the connection and the disconnection of an automated clutch between engine and gearbox and clutch members of the gear box, relative to one another so that smooth gear shift is always obtained at the correct speed. The advantage of such types of automatic transmission is that, firstly, with respect to use in AWD vehicles it is simpler, more robust and can be produced at substantially lower costs, and secondly, it has higher efficiency, which results in lower fuel consumption.

In order to perform gear shifts faster, it is known to measure torque for example at the input shaft, so as to be able to control engine output torque in a more optimal way. Torque measurement however, is not easy, since the object that is to be measured (the shaft that transmits the torque) rotates. This makes application of measurement tools such as strain gauges (that are known for measuring small deformations that are the result of the torque exerted on the shaft) difficult and cumbersome.

WO 2001/73389 discloses a sensor for non-contact detection of torque on a shaft by measuring resonance frequency of a string attached to two colours on a shaft. As the shaft is twisted, the string will increase or decrease its pretention, and thereby change its lateral vibration resonance frequency. By measuring the prevailing resonance frequency, it is possible to indirectly determine the torque applied over the shaft.

The known torque measurement systems suffer from various drawbacks, such as slow response times, insufficient accuracy for use in vehicles transmissions, expensive sensor components or complex and/or sensitive sensor systems.

It is an object of the present invention to provide a torque sensor system that is relatively cheap, robust, sufficiently accurate and allows to measure the torque transmitted to a shaft in real time.

To this end, the torque sensor system according to the invention comprises a frame supporting a first shaft and a second shaft, said first shaft comprising first connector means that are connected to second connector means comprised by the second shaft so that a torque is transmittable via the first and second connector means from the first shaft to the second shaft, wherein the first connector means and second connector means are formed so that transmitting a torque induces a reaction force to the frame, wherein the frame is provided with load sensing means that are adapted to measure the reaction force, and an output of the load sensing means represents the transmitted torque.

The present invention is based on the insight that when a torque is transmitted from a first shaft to a second shaft, whereby the connection between the first shaft and second shaft is unbalanced (force being applied to only one side of the shaft), the frame holding the shaft is subjected to a reaction force that is directly proportional to the transmitted torque. A torque can be applied to a shaft by applying a force, that is transverse to the axis direction of the shaft, and at a distance from the axis of the shaft. Two opposite forces can be applied at opposite sides of the shaft, thereby applying a torque to the shaft in a balanced manner. Such balanced application of a torque to the shaft will not induce a reaction force to the frame via the shaft. Alternatively, only one force can be applied to the shaft at a distance from the shaft axis, so that a reaction force will be felt by the frame holding the shaft (since in a stationary assembly the sum of the forces is zero). The reaction force that is the result of an unbalanced transmission of a torque, is directly proportional to the magnitude of the torque. This reaction force is borne by the frame supporting the shaft. This frame can be provided with load sensing means for measuring the reaction force. In this manner, the torque that is transmitted to the second shaft can be measured by measuring the load on the frame. The frame is typically mounted in a fixed position, so that application of load sensing means is easy. Thereby, the invention provides in a torque sensor system that is very simple and consequently relatively cheap, and wherein the torque can be measured in real time.

Preferably, the frame comprises a housing with first supporting means supporting the first shaft and second supporting means supporting the second shaft. In addition, preferably the housing further surrounds the first and second connector means. Connection of the shafts is in mechanical industries, as well as in vehicles often shielded from the environment by making the connection in a housing. The housing ensures that the connection elements, the first connector means and second connector means, are kept free of dirt and other environmental contaminations. Furthermore, the housing shields the connection from persons and animals thereby enhancing the safety of the connection. It will be clear that the housing can be made in one piece as well as an assembly of multiple elements.

Preferably, the load sensing means are positioned adjacent to the first and/or second shaft at a deformation zone of the frame that deforms under application of the reaction force. By placing the load sensing means at a location that is close to one of the shafts (adjacent thereto) and at a deformation zone, where the frame (or the housing forming the frame) deforms under application of the reaction force, the reaction force can be measured with the highest possible accuracy. Thereby, a reliable torque measurement is obtained.

Preferably, the first connector means is a first gear and the second connector means is a second gear, the first and second gear being positioned in an engaging relationship so that a torque is transmittable. Gears are known to be reliable in transmitting a torque from a first to a second shaft. Furthermore, by using gears, an unbalanced transmission of the torque is obtained because two gear wheels engage at a predefined engaging zone where the force (that is hereabove described) is transmitted to the shaft. This force is always directed in substantially the same direction so that the reaction force can be expected at one location of the frame. This makes application of the present invention, whereby the reaction force is measured as an indication of the transmitted torque, more easy.

Preferably the load sensing means comprise at least one strain gauge. Strain gauges are known to be reliable in measuring small deformations of an object. Furthermore, strain gauges are relatively cheap and easy to apply.

As described above, the torque sensor system of the invention is particularly applicable in vehicles, more particularly in all wheel drive (AWD) agricultural vehicles.

The invention further relates to a method for measuring a torque via a torque measurement system comprising a frame supporting a first shaft and a second shaft, the first shaft comprising first connector means that are connected to second connector means comprised by the second shaft, the method comprising transmitting a torque via the first and second connector means from the first shaft to the second shaft; determining a reaction force that is induced to the frame when the torque is transmitted; and measuring the reaction force via load sensing means so that an output of the load sensing means represents the transmitted torque.

According to the method of the invention, the reaction force felt by the frame is determined. The reaction force is a reaction to an unbalanced force that is applied to the second shaft. This unbalanced force is applied to the shaft to transmit a torque from the first shaft to the second shaft. Thereby the measured reaction force is directly proportional to the transmitted torque. Advantages and effects are similar to those described above in relation to the apparatus.

Preferably, after the determining of the reaction force, the method further comprises determining a deformation zone of the frame adjacent to the first and/or second shaft, which deformation zone deforms under application of the reaction force; wherein measuring the reaction force via load sensing means is conducted at the determined deformation zone.

Preferably the determining of the deformation zone is conducted via finite element analysis (FEA). FEA is well known and used in development and engineering environments. Therefore conducting a finite element analysis upon the engineered system where a torque is to be measured, FEA can show the zones in the system where a high stress can be expected. These zones will deform under application of the torque, and are therefore referred to as the deformation zone.

SUMMARY OF THE INVENTION

A torque sensor system is provided, which comprises a frame supporting a first shaft and a second shaft. The first shaft comprises a first connector that is connected to second connector comprised by the second shaft so that a torque is transmittable via the first and second connectors from the first shaft to the second shaft. The first connector and second connector are formed such that transmitting a torque induces a reaction force to the frame. The frame is provided with at least one load sensor that is adapted to measure the reaction force, such that an output of the load sensor represents the transmitted torque.

BRIEF DESCRIPTION OF THE DRAWINGS

The invention will now be described in more details with respect to the drawings illustrating some preferred embodiments of the invention. In the drawings.

In the drawings a same reference number has been allocated to a same or analogous element.

DETAILED DESCRIPTION OF THE EMBODIMENT(S)

Figure 1:
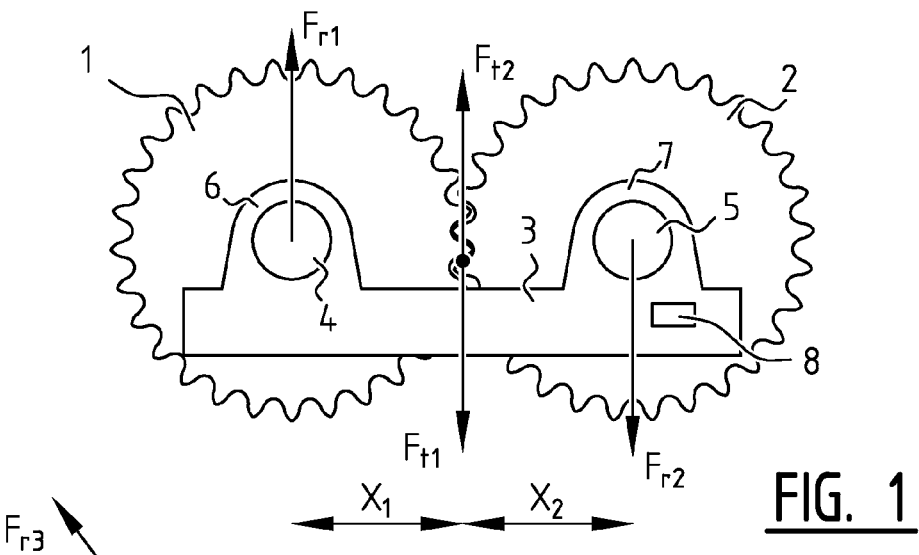
FIG. 1 shows a schematic representation of a side view of a torque sensor system according to a first embodiment of the invention.

FIG. 1 shows a first gear 1 and a second gear 2 mounted in an engaging relationship. The gears are mounted to a frame 3 via a first shaft 4 and a second shaft 5 that respectively comprise the first gear 1 and the second gear 2. The first shaft 4 is supported by the frame 3 via first supporting means 6, which are schematically represented in the figure. The first frame support or first supporting means 6 can further comprise bearings (not shown) for facilitating rotation of the shaft. In a similar manner, the second shaft 5 is supported by the frame 3 via second frame support or second supporting means 7.

According to the invention, a frame 3 is a rigid structure that is made in one piece or that is made as an assembly of multiple elements. The frame 3 according to the invention can be formed as a closed housing showing at least two openings through which the first and second shaft 4, 5 can be extended.

In operation, when the first shaft 4 is driven by external drive means (such as a motor), a rotation is transmitted from the first shaft 4 to the second shaft 5 via the first gear 1 and the second gear 2. Thereby, the first gear 1 and second gear 2 function as first and second connectors or first and second connector means for connecting the first shaft 4 with the second shaft 5. Via the gears, a rotation and a torque can be transmitted from the first shaft 4 to the second shaft 5.

In transmitting a torque, the first gear 1 applies a first transmission force FT1 to the second gear 2. The second gear 2 counteracts on this force by a second transmission force FT2. Considering only the first gear 1, when a transmission force FT 1 is applied to the first gear 1, a reaction force must be present at the first gear 1, otherwise the first gear 1 would accelerate in the direction of the force (in a fixed construction, sum of the forces is zero). The first gear is supported by the frame 3, and consequently, the reaction force is applied to this frame 3. The shaft 4 is held at its position by the frame supporting means 6. Therefore, their reaction force FR1 will be borne by this frame 3. In a similar manner, the second transmission force that is applied to the second gear induces a reaction force FR 2 that is transmitted by the second shaft 5 to the frame 3. Decreasing the transmitted torque would decrease the first and second transmission force and would consequently decrease the reaction force felt by the frame 3. Increasing the transmitted torque would increase the transmission forces and would consequently increase the reaction forces transmitted to the support 3. Therefore, the reaction force FR1, FR2 is directly proportional to the transmitted torque.

One or more load sensing sensors or load sensing means 8 are applied to the frame 3 adjacent to the first and/or second shaft 5. Thereby, the load sensing means 8 can be formed as, for example, but not by way of limitation, strain gauges measuring a deformation of the frame 3. The strain gauges are applied to the frame 3 at the location where the frame 3 deforms under application of the reaction force FR2. In this manner, by applying such load sensing means, the reaction force FR2 can be measured by the load sensing means. Consequently, an output of the load sensing means gives an indication of the torque that is transmitted from the first shaft 4 to the second shaft 5. In this manner, a torque can be measured at a non-rotating object of the system (i.e., the frame in this case), whereas conventionally, a torque is measured on the rotating elements such as the shaft or gear.

A skilled person reading the above description, regarding FIG. 1 will readily understand that this is an explanation of the working principles, which can be applied in various manners and forms. For example, where FIG. 1 shows a simple frame 3 in the form of a beam, a skilled person will understand that when a first and second shaft 4,5 are connected inside a housing, that the housing can be provided with load sensing means 8 adjacent to the first and/or second shaft 4,5 to measure the torque. A skilled person will also understand that it is not necessary for the first gear 1 and the second gear 2 to be aligned as is shown in FIG. 1. The gears can be positioned in various manners with respect to one another, for example under an angle with respect to one another (such as in a differential). A skilled person will also understand that the connectors or connector means do not necessarily need to be gears as is shown in FIG. 1. For example, the first connector means 1 could be formed as a worm wheel, while the second connector means 2 is a conventional gear. Various connectors or connector means are applicable in the invention, when the connector means engage in an unbalanced manner with respect to at least one of the shafts. Due to the unbalanced connection, a reaction force will be transmitted to the shaft, which can be measured via load sensing means.

Figure 2A:
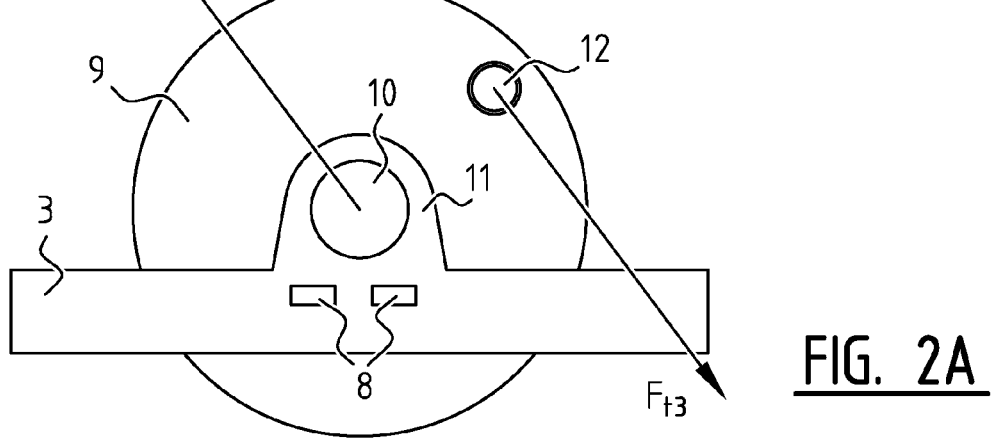
FIG. 2A shows a schematic representation of a side view of a torque sensor system according to a second embodiment of the invention.
Figure 2B:
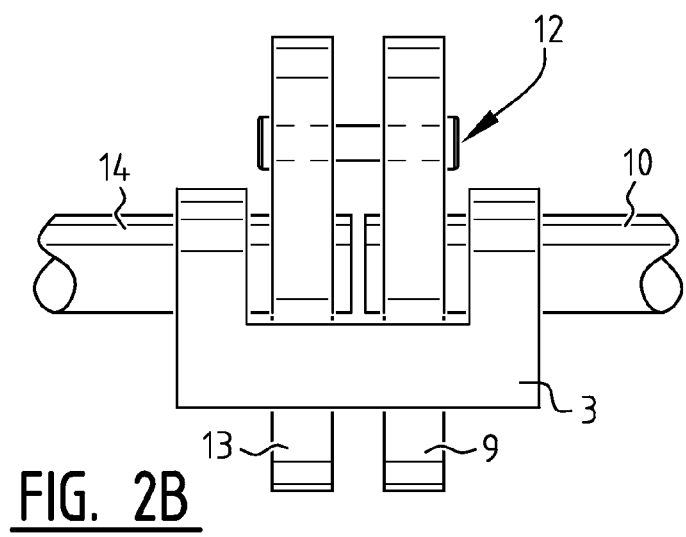
FIG. 2B show a schematic representation of a front plan view of the torque sensor system according to the second embodiment of the invention illustrated in FIG. 2A.

FIG. 2 shows an alternative embodiment of the invention and shows a frame 3 that supports two shafts 10, 14 which axes coincide with one another. The first shaft and second shaft 10, 14 are respectively provided with disks 9, 13. These disks 9, 13 form the connectors or connector means for connecting the first shaft 10 with the second shaft 14 so that a torque can be transmitted from the first shaft to the second shaft. The disks 9, 13 are interconnected via a bolt 12, shown in FIG. 2B, which can be a sheering bolt. Sheering bolts are used in mechanical drive trains to protect the drive train from overload. FIG. 2A shows how, when a torque is transmitted from the first shaft 10 to the second shaft 14, a transmission force FT3 is applied via the bolt 12 to the disk 9, which is held by frame support or supporting means 11 in a fixed position with respect to the frame 3, and a reaction force FR3 is felt by the frame 3. The frame can be provided with load sensors or load sensing means 8 to measure the reaction force FR3. In this regard, the reaction force rotates along with the disk 9 rotation. Thereby, the rotation speed of the force is directly proportional to the rotation speed of the disk, while the magnitude of the force FR 3 is proportional to the transmitted torque. Thereby, this figure shows an alternative embodiment where an unbalanced transmission of a rotation (in this case via the bolt 12) results in a reaction force that represents the transmitted torque.

Figure 3:
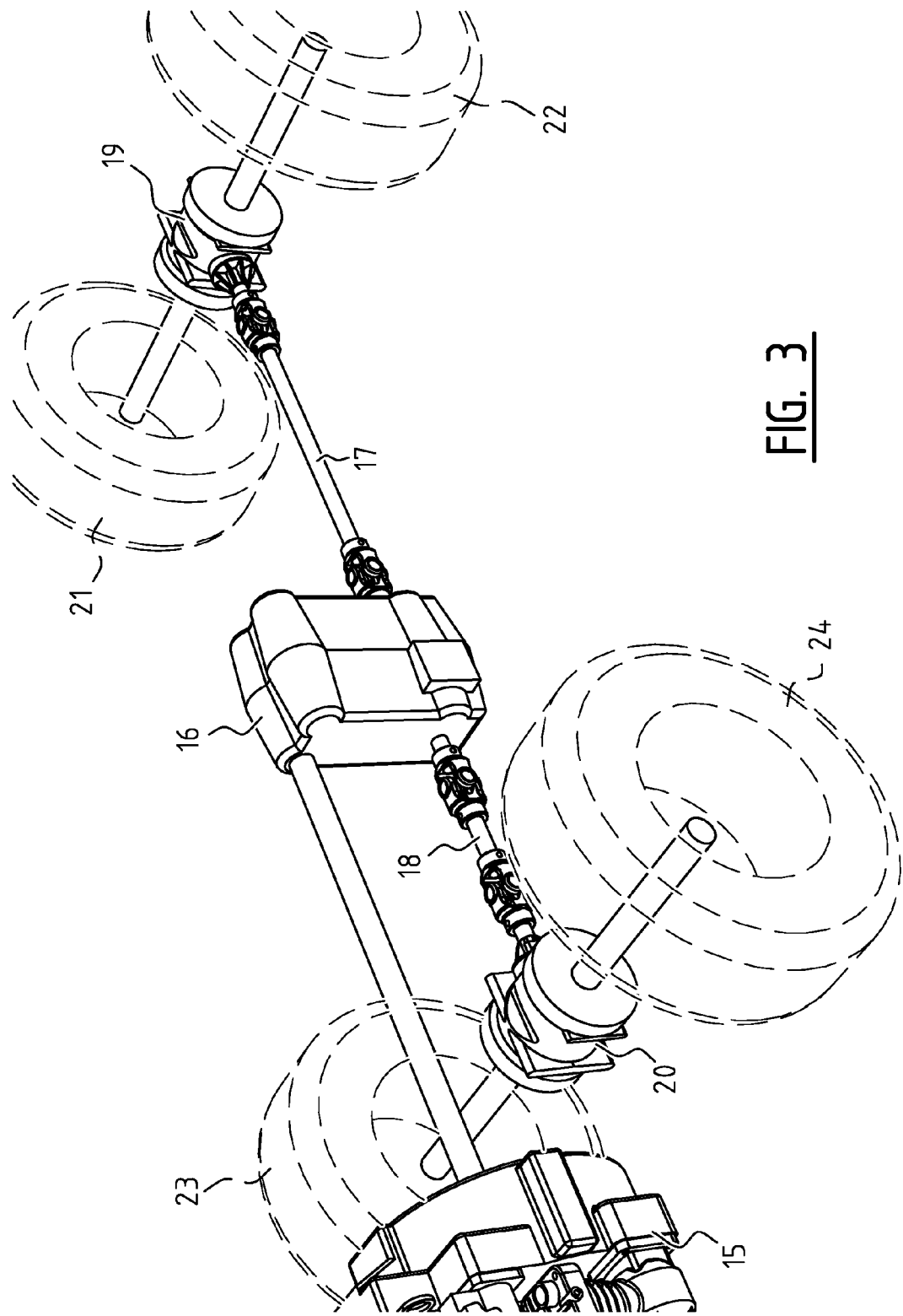
FIG. 3 shows a schematic representation of a perspective view of a drive line for an all wheel drive vehicle, wherein the invention is applicable.

FIG. 3 shows a drive train wherein the torque sensor system of the invention is applicable. The figure shows a gearbox 16 that is driven by a motor 15. The gearbox 16 transmits the power to a rear shaft 17 and a front shaft 18. The rear shaft 17 is connected to the rear differential 19 that transmits the power from the rear shaft 17 to the two rear wheels 21, 22. The front shaft 18 is connected to the front differential 20 that transmits the power from the front shaft 18 to the two front wheels 23, 24. Thereby, the differentials 20, 19 can be provided with torque sensor systems according to the invention so that the transmitted torque can be measured, and the gearbox 16 can be steered to optimize power transmission. In such system, a comparator can be added for comparing the measured torque at the front shaft 18 and at the rear shaft 17. Based on the comparison, the gearbox 16 for example adapts torque distribution. This example makes clear how vehicle transmission systems can be adapted/optimized using load sensors or load sensor means outputs. Engine torque, clutches etc. can be adapted based on torque readings.

Preferably the measured torque is displayed to a driver of the vehicle (or to an operator of the apparatus) in which the invention is implemented. To this end, a driver cabin can be provided with a display that is operationally connected to an output of the load sensing means, wherein the display is provided to visualize the output (the measured torque). Such display would allow the driver to intervene by for example decreasing the engine speed.

Preferably, the output of the load sensors or load sensing means is connected to a comparator which compares the output with a threshold. Thereby, the threshold is chosen to that overload of the drive train, in which the load sensing means is implemented, can be detected. When the comparator detects that the output of the load sensing means exceeds the threshold, a warning signal is generated. This warning signal can be implemented in the form of a sound signal, or a visual signal, or a sensible signal, or any combination thereof.

The above described embodiments and the shown figures are illustrative and serve only for a better understanding of the invention. The invention is not limited to the described embodiments. Different alternatives described in the text can be freely combined by a skilled person and developed in more detail to form an operational whole without departing from the essence of the invention. The scope of protection of the invention will therefore be defined solely by the claims.

The invention claimed is:

1. A torque sensor system comprising:
   a frame supporting a first shaft and a second shaft, the first shaft comprising first connector means that are connected to second connector means comprised by the second shaft so that a torque is transmittable via the first and second connector means from the first shaft to the second shaft,
   wherein the first connector means and second connector means are formed such that transmitting a torque induces a reaction force to the frame,
   wherein the frame is provided with load sensing means that are adapted to measure the reaction force, such that an output of the load sensing means represents the transmitted torque, and
   wherein the load sensing means are positioned on a planar surface of the frame in an identified deformation zone determined by finite element analysis that deforms upon application of the reaction force, the deformation zone and load sensing means positioned next to the first and/or second shaft.

2. The torque sensor system according to claim 1, wherein the frame comprises a housing with a first supporting means supporting the first shaft and a second supporting means supporting the second shaft.

3. The torque sensor system according to claim 1, wherein the first connector means is a first gear and the second connector means is a second gear, the first and second gear being positioned in an engaging relationship so that a torque is transmittable.

4. The torque sensor system according to claim 3, wherein the load sensing means comprise at least one strain gauge.

5. The torque sensor system according to claim 1, provided in an all-wheel drive agricultural vehicle.

6. The torque sensor system according to claim 5, wherein an output of the load sensing means is connected to the vehicle's power controlling system provided for controlling the power that is transmitted to wheels based on the measured torque.

7. The torque sensor system according to claim 6, wherein the vehicle comprises a driver cabin with a screen, wherein an output of the load sensing means is adapted to be visualized on the screen upon request of a driver.

8. The torque sensor system of claim 1, wherein the load sensing means provides a value which is compared to a threshold value, and if the threshold value is exceeded, a warning signal is issued.

9. The torque sensor system of claim 8, wherein the load sensing means are not positioned on a portion of a bearing housing or positioned to be rotated about the first shaft or the second shaft.

10. A torque sensor system comprising:
a frame supporting a first shaft and a second shaft, the first shaft comprising a first connector that is connected to second connector comprised by the second shaft so that a torque is transmittable via the first and second connectors from the first shaft to the second shaft,
wherein the first connector and second connector are formed such that transmitting a torque induces a reaction force to the frame,
wherein the frame is provided with at least one load sensor that is adapted to measure the reaction force, such that an output of the load sensor represents the transmitted torque, and
wherein the at least one load sensor is positioned on a planar surface of the frame in an identified deformation zone determined by finite element analysis that deforms upon application of the reaction force, the deformation zone and the at least one load sensor located next to the first and/or second shaft.

11. The torque sensor system according to claim 10, wherein the frame comprises a housing with a first frame support supporting the first shaft and a second frame support supporting the second shaft.

12. The torque sensor system according to claim 10, wherein the first connector is a first gear and the second connector is a second gear, the first and second gear being positioned in an engaging relationship so that a torque is transmittable.

13. The torque sensor system according to claim 12, wherein the load sensor comprises at least one strain gauge.

14. The torque sensor system of claim 10, wherein the at least one load sensor provides a value which is compared to a threshold value, and if the threshold value is exceeded, a warning signal is issued.

15. The torque sensor system of claim 14, wherein the at least one load sensor and the deformation zone are not positioned on a portion of a bearing housing or positioned to be rotated about the first shaft or the second shaft.

* * * * *